May 10, 1949.    R. E. FEARON    2,469,460
RADIOACTIVITY MEASUREMENT
Filed April 12, 1945
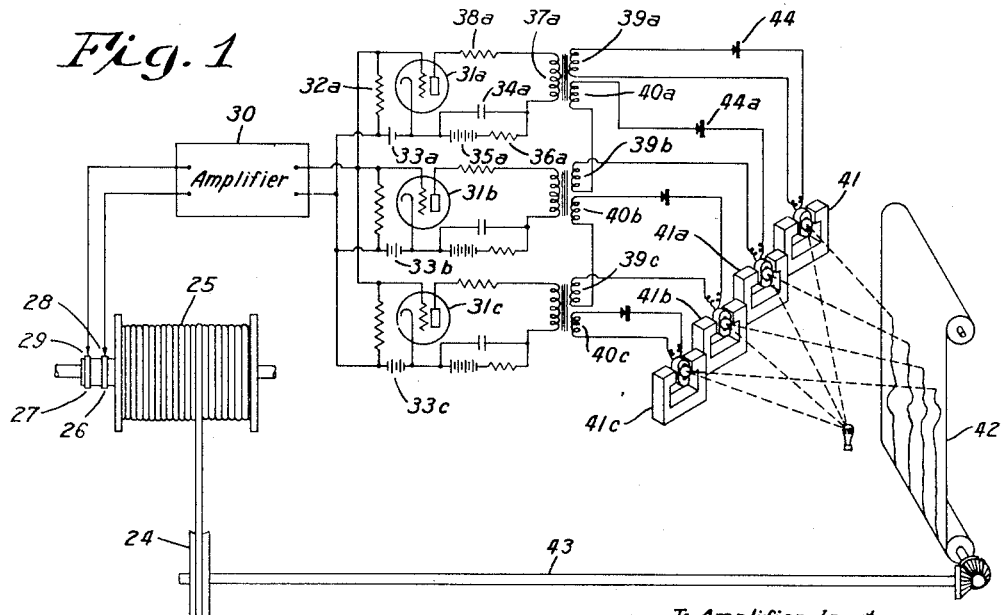
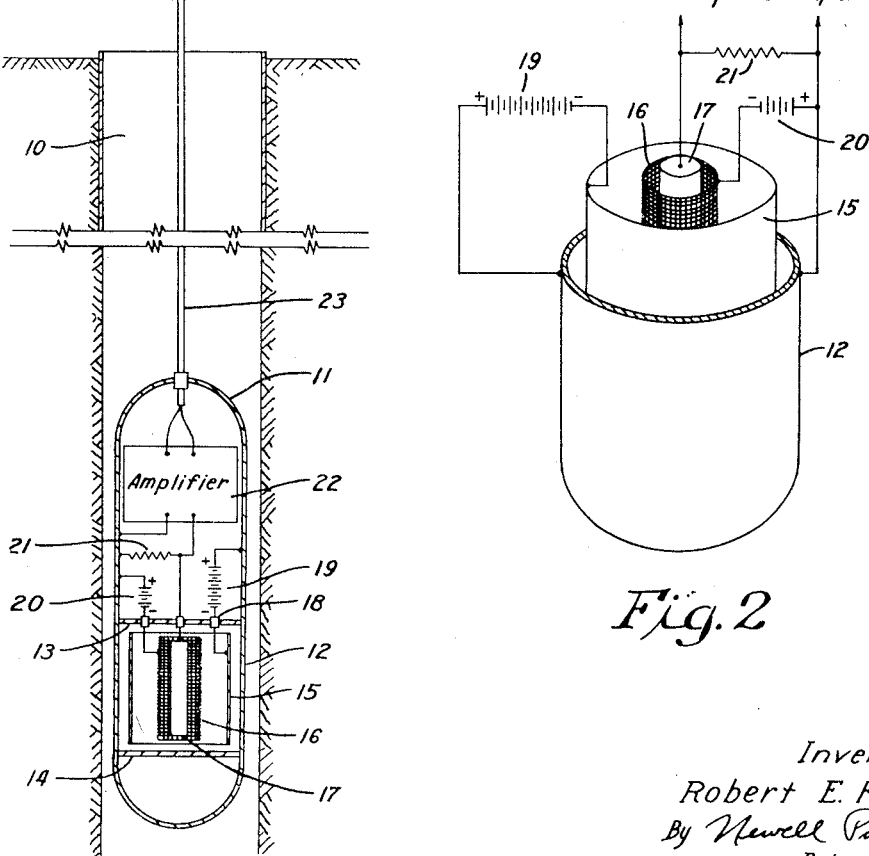
Inventor:
Robert E. Fearon
By Newell Pottorf
Patent Agent Patented May 10, 1949

2,469,460

UNITED STATES PATENT OFFICE 2,469,460

RADIOACTIVITY MEASUREMENT

Robert E. Fearon, Tulsa, Okla., assignor to Stanolind Oil and Gas Company, Tulsa, Okla., a corporation of Delaware Application April 12, 1945, Serial No. 588,022

9 Claims. (Cl. 250—83.6)

This invention relates generally to the measurement of radiations for the purpose of identifying radioactive substances, and is more particularly concerned with the measurement of gamma rays from very weak sources such as are encountered in the logging of wells. It is applicable equally to the measurement of radiations from substances that are naturally radioactive and from those in which radioactivity is induced by excitation from external sources of energy.

The simplest measurement of gamma radiation and the usual measurement performed in the logging of wells is the determination of total intensity without regard to the spectral energy distribution, or the energy or wave length of individual rays. For many purposes this measurement is adequate. However, as it is well known that many of the various chemical elements emit gamma rays of different energies, and that for each the spectral distribution of these rays is unique, whether the substance be naturally radioactive or artificially excited, it is apparent that a knowledge of this distribution can be of very great value in detecting and measuring these elements when their quantities or concentrations are too small for detection by the usual chemical analyses. In other words, if their gamma rays can be individually studied, extremely small concentrations of naturally or artificially excitable radioactive elements may be determined both quantitatively and qualitatively. Also, if instead of or in addition to one total intensity log several other well logs are made available, such as one for radium, another for actinium, another representing potassium, and perhaps others each representing one of the elements in which radioactivity can be induced as by neutron bombardment or capture, it is believed obvious that the identification of the geological strata encountered in well logging will be materially aided.

Although methods of performing this energy distribution measurement have been devised for laboratory use, most of them have not been suitable for very weak sources and for well logging due to the fact that inordinately long times would be required for the production of an observable result, or the equipment is too bulky and complex for use in wells. Accordingly, in the field of well logging special methods of measurement have necessarily been devised which aim to utilize with as great efficiency as possible the small radiation energy available.

One of the principal manifestations of the presence of gamma rays is their ready reaction with the extra-nuclear electrons of atoms, whereby these electrons receive or absorb part of the energy of the gamma ray. In the case of an atmosphere of gas these electrons are given such a high velocity of motion that they are usually completely removed from the gaseous atoms or molecules, leaving them behind in the form of positively charged gaseous ions. Upon application of an electric field these ions so formed may be caused to move through the gas, to a negatively charged surface, for example, where their charges may be neutralized. This is the principle of the ionization chamber which, by reason of its simplicity and relatively high efficiency when filled to a high pressure with an inert gas, is very often employed in gamma ray measurments.

With this device the probability of its responding to any gamma ray photon impinging thereon is relatively high. For measuring spectral distribution qualitatively a plurality of total intensity measurements are taken, each using a different thickness of shielding absorbent material. The hardening of the rays in passing through successively thicker shields which remove more and more of the softer components is taken as an indication of their spectral distribution. For weak sources, however, it will be seen that the interposing of absorbing shields will reduce an already small radiation energy nearly to the vanishing point, vastly increasing the difficulty of getting accurate results.

An alternative method of determining spectral distribution is based on the observation that a certain fraction of the gamma rays which traverse matter are completely absorbed by the producing of photoelectrons. In this process the total energy of the ray is imparted to a single electron which then moves off at extremely high velocity. The energy of the ray, which is necessarily equal to that of the electron, is then determined indirectly by measuring the range or penetrating power of the electron. In one apparatus arrangement suitable for well logging each photoelectron is allowed to pass through the thin walls of and actuate a plurality of Geiger-Mueller counters, the number of walls penetrated and counters responding thus being proportional to the electron energy. The difficulties here are that only part of the photoelectrons produced travel in the proper direction to actuate the counters, only a fraction of the gamma rays detected will produce photoelectrons, and a large portion of the incident gamma rays may pass entirely through the system without being detected.

In a previous patent of this inventor, U. S. Patent 2,351,028, an improvement was disclosed for gamma ray spectral distribution measurements which aimed to take advantage of the high efficiency of the ionization chamber as a detector. An ionization chamber was employed of sufficient size and filled with inert gas to a sufficient density that the probability of complete absorption in the gas of any entering gamma ray would be relatively large. By whatever process the ray was absorbed, its energy would eventually be used up in forming ion pairs in the gas, the number of such pairs being directly proportional to the total ray energy, as the energy of formation of each such pair is a known constant amount. The number of pairs was measured by applying a voltage between electrodes in the gas and measuring the total charge carried by the positive ions associated with the absorption of each gamma ray.

Further work has now made it possible to evaluate some of the factors to be reckoned with in practicing this invention. Considering that an ionization chamber designed for well logging may have to respond to as many as 200 individual gamma ray photons per second, and that the positive ions thus created by each gamma ray must be collected and measured in very much less than $1/200$ of a second in order to distinguish individual rays, approximate calculations can be made of the magnitude of the propelling electric field which is required. For a suitable gas such as argon, compressed to a sufficient density and of sufficient volume to guarantee substantially complete absorption, it turns out that a potential source of several hundred thousand volts will be required. In addition to great magnitude this source must be of very high stability. Further, microphonism, which may be considered as electrical noise arising from mechanical vibration of electrical circuit and ionization chamber elements, and which is already appreciable at a few hundred volts, increasing as the square of the applied voltage, would at this high voltage apparently become intolerable.

In view of the foregoing it is a primary object of this invention to provide an improved method and apparatus for the measurement of gamma ray spectral distributions. It is a further object to provide for this purpose a method and apparatus capable of efficiently utilizing the gamma radiation from weak sources, but free from the requirement of excessively high voltage sources of unusual stability. Another object is to provide an ionization chamber construction in which charged particles of a selected polarity may be collected and measured in short time intervals and without interference from or influence by charged particles of the opposite polarity. A still further object is to provide an ionization chamber in which the electrons liberated by the absorption of gamma rays therein remain free and may be collected and measured independently of the presence of the positive ions. Other objects, uses, and advantages of the invention will become apparent as the description thereof proceeds.

As indicated briefly in this statement, of objects, it has been found that if provision is made for the collecting of ions of one polarity without interference from those of the opposite sign, a high pressure ionization chamber may very satisfactorily be employed for measuring gamma ray spectra. Specifically, I have found that by collecting the electrons liberated in a gas by the absorption of individual gamma ray photons therein, the need for a high voltage source and all the difficulties associated therewith are partically eliminated. At the same time full advantage is taken of the high efficiency of the ionization chamber.

Although its use heretofore has mostly been confined to chambers where the positive ion current is to be measured, argon has been found to be a quite suitable gas for use in the chamber of this invention, provided it is very pure or mixed only with other inert non-radioactive gases of the zero group of the periodic table; namely, helium, neon, krypton, and xenon. A brief review of the critical properties of argon will show why this is so.

Whereas at atmospheric pressure and temperature the mobility of positive argon ions is only about 1.5 centimeters per second for a field strength of one volt per centimeter, under the same conditions the mobility of free electrons in argon is nearly 900 times greater, or about 1300 centimeters per second. This means that the voltage applied to the ionization chamber electrodes to sweep out the free electrons need be only $1/900$ of that required to collect the positive ions in the same short time interval. In other words, instead of applying a field of hundreds of thousands of volts to the chamber electrodes only a few hundred volts are needed. This is well within the realm of practical possibilities to furnish either for well logging or for laboratory use. Also microphonism at these voltages is not so severe that it cannot be satisfactorily dealt with or filtered out.

The possibility of utilizing argon and the other zero group gases named also depends on at least two other factors. The free electrons must remain free and not become attached to heavy atoms thereby producing heavy negative ions having about the same small mobility as the positive argon ions. Neither must the free electrons tend to recombine with the positive argon ions in the space between electrodes. The second of these effects depends to a considerable extent on the first, since it has been observed that as long as the electrons and the positive ions are moving at considerable velocities relative to each other in a fairly strong electric field, such recombination of electrons and ions as does occur is negligible, and the free electrons remain free. Recombination of electrons and positive ions in the gas space chiefly occurs after the electrons become immobilized by attaching themselves to neutral molecules thereby forming heavy negative ions.

Data on the probability of electron attachment in argon are incomplete, but to indicate that the occurrence is very infrequent, not oftener than once in $10^{10}$ collisions, if at all. In argon compressed to a density suitable for a well logging ionization chamber an electron should undergo about $10^{10}$ collisions in $1/200$ second. As it is contemplated that all the electrons freed by the absorption of a single gamma ray photon will be collected in a much shorter time than this, it is apparent that for the purposes of the present invention the effect of electron attachment can be safely neglected.

Although nitrogen is often used in ionization chambers where the charge carried by the positive ions is measured, it seems to be unsuitable for the chamber here described. Despite the data that electron attachment and the consequent formation of molecular negative ions occur infrequently or practically not at all in nitrogen, there are some indications that they do occur to some extent. The superiority of argon over nitrogen in this respect is quite noticeable. However, it is thought that the presence of nitrogen in amounts not exceeding a small fraction of one per cent probably would not do any great harm. On the other hand, the presence of oxygen, chlorine, nitrous oxide, and like gases which very readily form negative molecular ions by electron attachment, even to the extent of much less than one part per million, is definitely deleterious and must be avoided. Fortunately most harmful gases are chemically reactive and can be removed by chemical methods from mixtures of zero group gases.

It should be pointed out also that all the gases in the zero group of the periodic table except radon are suitable for this use, argon being preferred and described partly because of the relative scarcity of krypton and xenon. If the latter were available in sufficient quantity, they would be even more desirable than argon because of their greater density. Helium and neon are less suitable than argon chiefly because with their smaller density a greater volume would be needed to give the required absorbing power for hard gamma rays.

In the drawing appended hereto and forming a part of this specification I have shown one embodiment of the invention. As this is to be regarded as illustrative only, the invention should not be considered as limited solely thereto. In this drawing, in which the same reference numeral in different figures refers to the same or a corresponding part.

Figure 1 is a vertical section of the apparatus of the invention applied to well logging, a portion of the surface equipment being represented diagrammatically; and Figure 2 is a perspective view of the ionization chamber of the invention with the top end cut away showing the electrode arrangement and the circuit connections thereto.

Referring now to Figure 1 showing an embodiment of the invention suitable for well logging, adapted to be moved through well 10 is an instrument having an outer fluid-tight cylindrical case 11 rounded at its upper and lower ends for easy passage through the well fluids. An ionization chamber 12 is formed by sealing off a section of case 11 by upper and lower walls 13 and 14. This space is filled with pure argon or a mixture of argon with other zero group gases to a high pressure, preferably from 100 to 200 atmospheres.

Arranged concentrically within chamber 12 but insulated therefrom and from each other are three electrodes 15, 16, 17, also shown in Figure 2. Outer electrode 15 is preferably cylindrical and of only slightly less diameter than case 11; electrode 16 may suitably be a wire screen of considerably smaller diameter than outer electrode 15; while inner electrode 17 may be a tube or rod of somewhat smaller diameter than screen 16. By a lead brought out through a pressure-tight insulating bushing 18 outer electrode 15 is supplied with voltage from the negative terminal of a source 19, the positive side of which is connected to case 11, which is electrically the same as the outer wall of chamber 12. Source 19 may be a stable supply of the order of 1000 volts, although depending in part on the size of chamber 12 and the geometry of the various electrodes a supply of from 500 to 2000 volts may be employed. Screen electrode 16 is similarly supplied with voltage from the negative terminal of another potential source 20, the positive pole of which is also grounded to case 11. Inner central electrode 17 is connected to an amplifier input impedance 21, the other terminal of which is grounded to case 11. The voltage of source 20 is considerably less than source 19, being, for example, between 50 and 500 volts depending in part on the spacing between screen 16 and inner electrode 17. In general, the smaller this spacing is made, the less is the voltage required of battery 20.

Across impedance 21 is connected an amplifier 22 of high voltage sensitivity, the output of which is applied to cable 23 and thereby transmitted to the surface. After passing over a measuring sheave 24, cable 23 is spooled on a reel 25 and brought out to slip rings 26, 27, which are contacted by brushes 28, 29 connected to the input of a surface amplifier 30. Although two conductors are shown in cable 23, it is obvious that only one will be required if the earth is utilized for the return circuit.

There are many different ways of recording the output of amplifier 30 so as to indicate in convenient form gamma ray spectral distributions, one such being to make a single trace with a vibration or high frequency galvanometer as shown in my Patent No. 2,351,028 previously referred to. However, in connection with the present invention the use of parallel-connected scaling or counting circuits will be described. For illustrative purposes three such circuits are shown, but it is to be understood that as many will be used, adjusted to record as many different energy ranges, as may be appropriate for the problem at hand.

As all three of these circuits are practically identical, except for the signal level at which they are set to respond, one only will be fully described, it being understood that the other two are exactly the same as to circuit elements and operation unless differences are specifically pointed out.

Thyratron tube 31a, for example, is provided with an input circuit comprising an input impedance 32a, across which the output signal of amplifier 30 is applied, and a bias voltage source 33a of a value sufficient to prevent tube 31a from passing any current until a signal pulse of more than a predetermined magnitude occurs. The output circuit of thyratron 31a, connected in series between its plate and cathode, includes a condenser 34a, a transformer primary 37a and a discharge current limiting resistor 38a. The voltage applied to the plate of tube 31a is that appearing across condenser 34a, which is charged from a battery or voltage source 35a through a resistor 36a.

The other thyratrons 31b and 31c have identical input and output circuits except that the bias voltages supplied by batteries 33b and 33c are different from each other and from that of battery 33a, preferably increasing in the order 33a, 33b, 33c, respectively.

Both of the pair of transformer secondaries 39a, 40a are coupled to the output of thyratron 31a through primary 37a, while secondary pairs 39b, 40b and 39c, 40c are similarly coupled respectively to thyratrons 31b and 31c. Winding 39a alone may suitably be connected through a rectifier 44 to a ballistic galvanometer 41 carrying a mirror for recording by means of a light beam on a light-sensitive chart 42, which is moved in accordance with the depth of chamber 12 in well 10 by an appropriate driving connection 43 from sheave 24.

Winding 40a, however, is connected in series opposition with winding 39b, and these two secondaries thus combined are coupled through a rectifier 44a to a galvanometer 41a. Secondaries 40b and 39c are similarly combined and coupled to galvanometer 41b, while secondary 40c is alone connected to galvanometer 41c. Galvanometers 41a, 41b, and 41c may be of the same type as galvanometer 41 and adapted similarly to record separate traces on chart 42.

From an inspection of Figure 2 it will be apparent that the major part of the volume of chamber 12 is the space between outer electrode 15 and screen electrode 16, the space outside of electrode 15 between it and the case being only enough to prevent electrical breakdown. Therefore, for all practical purposes the complete absorption of each gamma ray photon entering chamber 12, and the consequent formation of free electrons and heavy positive ions, may be regarded as occurring inside electrode 15, between it and screen 16. By virtue of the high negative potential applied to outer electrode 15 by voltage source 19, these free electrons will be strongly repelled from electrode 15 and drawn in the direction of inner collecting electrode 17, which carries a net positive charge, since it is connected through impedance 21 with the positive terminal of source 19. The positive ions, on the other hand, will move toward electrode 15 in the direction opposite to the motion of the electrons; but on account of their comparatively low mobility they will tend to accumulate in the space between screen 16 and electrode 15.

If it were not for the presence of screen 16, electrode 17 would be exposed to the electric field of the considerable space charge associated with these slowly moving ions. The absorption of an additional gamma ray and the release of a new group of electrons would then appear only as a small effect against a large background. However, since screen 16 is maintained by battery 20 at a definite potential with respect to electrode 17, which is connected to battery 20 through impedance 21, screen 16 acts as an electrostatic shield and thus renders electrode 17 and the electrical circuits associated with it insensitive to events occurring outside the screen. The free electrons moving toward electrode 17 therefore begin exerting their effect only after they move through the openings of screen 16. Thereafter in falling through a uniform potential, supplied by battery 20, while traveling the remainder of the distance to electrode 17, the effect produced per unit charge is always the same. It is the space charge of these moving electrons approaching electrode 17 which produces a proportional current flow through impedance 21; or, in other words, the only effect to which electrode 17 is exposed is the moving field of these electrons, which is the desired effect. The resultant voltage drop across impedance 21, which is amplified and recorded, is thus always proportional to the total number of electrons moving in a group toward electrode 17, and hence is proportional to the gamma ray energy. After uniform amplification by amplifiers 22 and 30, a signal is thus created consisting of randomly spaced pulses each of an amplitude proportional to the total energy of a single gamma ray photon.

Considering now the operation of the scaling circuits of Figure 1, as has been indicated, a successively greater bias is applied by batteries 33a, 33b, and 33c, respectively to the control grids of thyratrons 31a, 31b, and 31c. Then, whenever the pulse applied to these parallel-connected grids is no larger than a predetermined small amplitude, the bias of batteries 33b and 33c will be sufficient to retain control, and only tube 31a will fire. For a pulse of somewhat larger amplitude both 31a and 31b will fire, while the grid of tube 31c remains under control. Similarly for a pulse of still larger amplitude all three thyratrons will break down and pass current.

When tube 31a becomes conducting, condenser 34a discharges suddenly, sending a single pulse of current through primary 37a and thereby inducing in secondaries 39a and 40a a corresponding pulse. That appearing in winding 39a is applied to and deflects galvanometer 41, while the pulse in 40a is applied to galvanometer 41a. Resistor 38a here comes into operation, preventing battery 35a from recharging condenser 34a before the grid of tube 31a can regain control. If, however, the signal pulse amplitude applied to the three grids is sufficient to fire both tubes 31a and 31b, galvanometer 41 records as before, but a pulse of voltage of equal and opposite polarity appears in secondary 39b canceling that in 40a, and galvanometer 41a remains unaffected. The pulse, which also appears in secondary 40b, will then be transmitted to galvanometer 41b. Similarly a signal pulse firing all three tubes will give rise to signals uncanceled only in winding 40c, actuating galvanometer 41c. In this way it will be seen that only one of the galvanometers 41a, 41b, and 41c will be deflected by a single gamma ray absorption, the particular one being determined by the total ray energy.

By making these galvanometers of low natural frequency compared to the frequency of occurrence of signal pulses an averaging effect is obtained, the deflection being proportional to an average of the pulse frequency in each amplitude range over a short preceding period of time. As tube 31a fires for signal pulses of all amplitudes, the output of winding 39a and the corresponding deflection of galvanometer 41 will always be proportional to the total gamma ray intensity. It will ordinarily be advantageous to record this on chart 42 along with the other traces, each representing the number of gamma rays per unit time falling within a specified energy range. Such a total intensity trace often aids in the interpretation of the records made in the manner described.

Although this description has been without reference to the source of the gamma rays being measured, it should be emphasized that some of the most useful applications of the invention may be to the detection of substances in which radioactivity can be artificially induced. Whereas only a few of the elements are naturally radioactive and can be detected and measured in this way, there are quite a number which emit characteristic gamma rays when bombarded with primary exciting agents such as neutrons. Accordingly, for well logging it is contemplated that a source of primary excitation may be lowered along with the detector of this invention in a manner well known in the art, and measurements made of the resultant radiations.

As it is apparent that many changes and modifications can be made in the invention as described without departing from the principles set forth, it is to be understood that the scope of the invention should not be limited to this specific embodiment, but is to be defined only by the accompanying claims.

I claim:

1. A method of indicating the energies associated with gamma ray quanta which comprises absorbing a plurality of said quanta in a dense gaseous atmosphere, whereby equal numbers of positive ions and free electrons are formed, separating said electrons from said ions, producing only from said separated electrons a plurality of electrical signals each proportional in amplitude to the number of said electrons freed in the absorption of one of said quanta, said positive ions being prevented from producing corresponding signals, and exposing said signals for observation.

2. A method of indicating the energies associated with gamma ray quanta which comprises exposing to said rays a confined volume of dense gas capable of forming upon ionization substantially only positive ions and free electrons, whereby groups of electrons are freed, each of which groups is associated with and proportional to the energy of one of said quanta, producing from each electron group an electrical signal proportional thereto said positive ions being prevented from producing corresponding signals, and exposing a plurality of said signals for observation.

3. A method of indicating gamma ray energies comprising substantially completely absorbing each individual gamma ray quantum by the production of ionization in a dense gas incapable of forming negative ions of molecular size, collecting at a surface electrically shielded from the space in which said ionization occurs and from the positive ions in said space the free electrons created by said quantum absorption, and producing only from the collected electrons an indication proportional to the total charge of said electrons associated with the absorption of said quantum.

4. A method of determining the energies of gamma rays from radioactive substances comprising the steps of substantially completely absorbing individual gamma ray quanta in a dense gaseous atmosphere by the production of ionization therein, withdrawing, to a space free from the influence of the positive ions and during an interval of time short compared with the average interval between the incidence of successive quanta, the free electrons created in said atmosphere by the absorption of each of said quanta, and producing only from the withdrawn electrons an indication of the total number of said electrons associated with the absorption of each quantum.

5. A method of determining the spectrum of gamma rays emitted by radioactive substances which comprises the steps of substantially completely absorbing individual quanta of said rays in a dense gaseous atmosphere by the production of ionization therein, said gas having substantially no tendency to form negatively charged ions of molecular size, withdrawing, during an interval of time short compared to the average interval between the absorption of successive quanta, the free electrons created in said atmosphere by the absorption of each of said quanta, producing only from said electrons an electrical pulse proportional in amplitude to the number of electrons associated with each gamma ray quantum absorption, the positive ions in said atmosphere being prevented from causing detectable electrical pulses, and producing an indication of the number of said pulses per unit time falling within each of a plurality of amplitude ranges.

6. Apparatus for indicating gamma-ray energies comprising a confined volume of dense gas, incapable of forming negative ions of molecular size, for substantially completely absorbing each individual gamma-ray quantum by the production of ionization therein, a surface electrically shielded from the space where ionization occurs for collecting only the free electrons created by said quantum absorption, the shielding of said surface being effective to prevent the positive ions in said gas from affecting the potential of said surface and means for producing only from said electrons an indication proportional to the total charge of said electrons associated with the absorption of said quantum.

7. Apparatus for logging wells comprising an ionization chamber adapted to be passed through a well, electrodes within said chamber for collecting only the electrons freed by ionization therein while excluding the effects produced by the positive ions present in said chamber, and means coupled to said electrodes for producing only from said electrons electrical pulses proportional to the number of electrons freed by each gamma ray quantum absorption.

8. Apparatus for gamma ray energy measurements comprising an ionization chamber filled with an inert gas at high pressure, a first electrode in said chamber maintained at a negative potential, a collecting electrode in said chamber maintained at a positive potential, a shielding electrode between said first and said collecting electrodes maintained at an intermediate potential and capable of allowing electrons to pass therethrough, the electric field at all points in said chamber being substantially less than that required for collision ionization, and said shielding electrode being effective to prevent space charges between it and said first electrode from exerting any appreciable effect on said collecting electrode, and means for amplifying and indicating the electron currents drawn to said collecting electrode.

9. Apparatus for gamma-ray energy measurement comprising an ionization chamber containing at high pressure an ionizable gas incapable of forming negative ions of molecular size, a pair of electrodes in said gas for applying an electric field thereto, means for maintaining said electrodes at a potential difference of between 500 and 2000 volts, a shield surrounding the positively charged one of said electrodes capable of passing free electrons therethrough, means for maintaining said shield at a negative potential of between 50 and 500 volts relative to said positively charged electrode, and means coupled to said positively charged electrode for producing an electric signal proportional to the number of electrons reaching said electrode, whereby pulses each of an amplitude proportional to the energy of a single gamma-ray quantum are generated.

ROBERT E. FEARON.

REFERENCES CITED

The following references are of record in the file of this patent:

UNITED STATES PATENTS

| Number | Name | Date |
| --- | --- | --- |
| 2,289,926 | Neufeld | July 14, 1932 |
| 2,351,028 | Fearon | June 13, 1944 |
| 2,398,324 | Pontecorva | Apr. 9, 1946 |
| 2,408,063 | Grieg | Sept. 24, 1946 |
| 2,413,440 | Farrington | Dec. 31, 1946 |

OTHER REFERENCES

Korf and Ramsey, Review, Scientific Instruments, vol. II, August 1940, pp. 267–269.